United States Patent Office 3,408,474
Patented Oct. 29, 1968

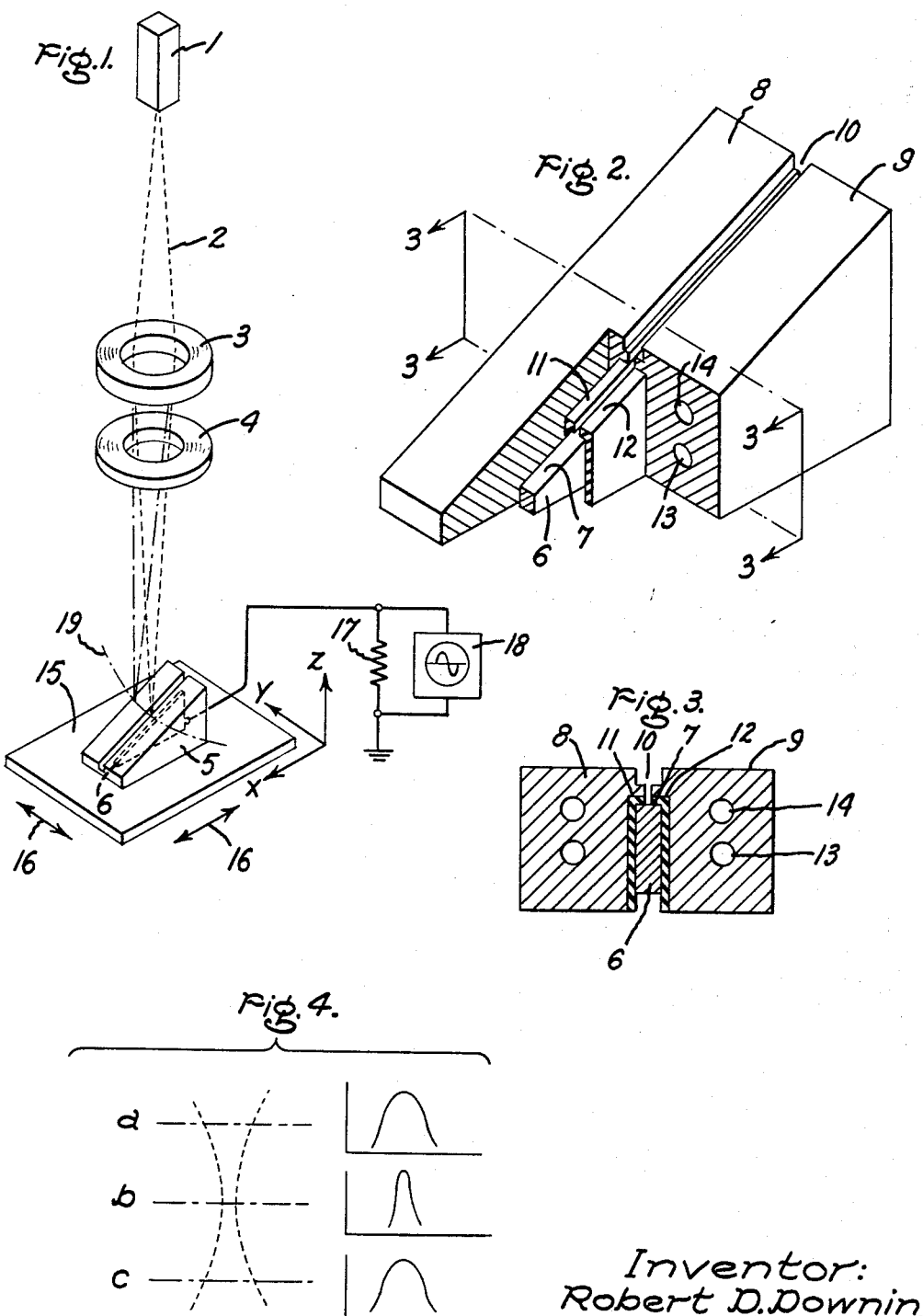

3,408,474
ELECTRON BEAM WELDING APPARATUS
Robert D. Downing, Schenectady, N.Y., assignor to General Electric Company, a corporation of New York
Filed Apr. 4, 1966, Ser. No. 539,757
8 Claims. (Cl. 219—121)

This invention relates to electron beam welding and particularly to apparatus for locating the focal point of an electron beam.

In electron beam welding systems, a beam of electrons is generated in a suitable cathode and accelerated by a potential gradient to a workpiece where it fuses the material to complete a weld. The systems usually include magnetic or electrical means for concentrating or focussing the electrons in the beam on the joint to be welded so as to apply the maximum available power to a small point.

It is of critical importance in such welding that the focal point of the electron beam be located properly with respect to the workpiece so that a weld of maximum strength is produced. Obviously, location in the plane of the joint is important since, if the beam is not centered on the joint, a weak, off-center weld may be produced. Alternatively, in the case of materials which melt at different rates under an electron beam, it may be desired to spot the beam slightly on side of the more resistant material so that the weld when completed is properly balanced. In addition, it has been found that the vertical location of the focal point with respect to the workpiece is of the utmost importance. If the beam is focussed precisely at the surface of the joint, the weld may not be deep enough to provide the desired strength. If, on the other hand, the beam is focussed to a point too far below the surface of the material, a poor weld may also be produced.

If the workpiece is placed in the path of the beam and the beam is located empirically, extensive damage to the workpiece may result. Accordingly, it has been previously attempted to spot the electron beam properly on the workpiece by reducing the power supplied to the beam to a nondestructive level, moving the beam to the proper location and increasing the power. However, it has been found that vertical location is still difficult and furthermore, as the power is increased to form the weld, the focal point changes, particularly in the vertical direction, thus moving from the desired location.

Accordingly, it is an object of the present invention to provide electron beam welding apparatus including means for precisely determining the horizontal and vertical location of the electron beam focal point.

It is a further object of this invention to provide new and improved apparatus for positioning the point of maximum intensity in an electron beam welding apparatus without damaging the workpiece.

Another object of this invention is a provision of electron bema welding apparatus including means for determining the vertical position of the electron beam focal point in relation to the thickness of the workpiece to be welded.

Briefly, in accord with one aspect of this invention, I provide electron beam welding appartus including an electron beam generator and focussing means and further including an electron beam focal point locator. The locator includes an electrode having a surface inclined in a given direction and a shield interposed between the beam source and the inclined electrode surface. The shield is provided with a slit aperture in the direction of the incline. Thus, by sweeping the electron beam in a direction perpendicular to the slit in an oscillatory fashion and comparing the magnitude of the current pulses to the electrode as it is moved to a variety of horizontal positions, the focal point can be found by selecting the horizontal position corresponding to maximum current. The vertical depth of the focal point is determined by virtue of the known slope of the electrode surface.

The novel features believed characteristic of the invention are set forth in the appended claims. The invention itself, together with further objects and advantages thereof may best be understood by reference to the following description taken in connection with the appended drawings in which:

FIGURE 1 is a schematic representation of electron beam welding apparatus in accord with the present invention;

FIGURE 2 is a perspective view, partially broken away, of an electron beam focal point locator in accord with the present invention;

FIGURE 3 is a cross-sectional view taken along the lines 3—3 of FIGURE 2; and

FIGURE 4 is a schematic representation of the correspondence between focal point location and current measured in using the present invention.

In FIGURE 1, an electron beam welding apparatus is illustrated which includes a source 1 for producing an electron beam 2. This source may, for example, comprise a hot cathode electrode emitter such as a Pierce gun or it may comprise a cold cathode device such as a plasma electron beam structure. If necessary, the beam may be made to converge at a desired region by means such as focussing coil 3; alternatively, the beam focussing means may be provided within the structure of the gun itself. A deflection coil 4 is also shown to provide for sweeping the beam to avoid continuous application of full beam power to a single spot.

In accord with the present invention, a means for determining the point of convergence of the electron beam is provided comprising a locator 5 shown in FIGURE 1 and, more clearly, in FIGURE 2. The locator comprises an electrode 6 having an inclined surface 7, the slope of the incline being predetermined and, preferably, constant. Shielding members 8 and 9 are interposed between the electron beam 2 and the electrode 6 and are arranged so as to provide a slit aperture 10 along the surface 7 and parallel to the incline. The shielding members are insulated from the electrode by dielectric members 11 and 12 which are also arranged to leave the slit aperture exposed. The electrode 6 and the shielding members 8 and 9 may be composed of any suitable conductive material such as copper. The insulating members 11 and 12 may be any suitable dielectric material such as mica. The shielding members 8 and 9 preferably include apertures or tubes 13 and 14 which provide for a flow of coolant through the respective members to prevent overheating and damage when the electron beam is applied. Since the voltage developed between electrod 6 and the work table is usually low, it is convenient to insulate solely by leaving a gap between the two. If higher voltages are to be developed, suitable insulation may be included. The gap is shown clearly in FIGURE 3.

In the apparatus illustrated in FIGURE 1, the focal point locator 5 is mounted on a work table 16, which, during welding operations, supports and the workpiece to be welded. The table 15 is arranged for universal movement in a horizontal plane as indicated by the arrows 16. This may be done, for example, by means of motor-driven worm gears or other suitable mechanical arrangements. Conveniently, the table 15 may also be arranged for rotation through 90°.

In further accord with this invention, an electrical readout means is provided for measuring the current applied to the electrode 6 by the electron beam. In the illustration of FIGURE 1, this comprises a resistor 17 connected between the electrode 6 and ground and an oscilloscope, represented schematically at 18. The oscilloscope 18 is connected to display the voltage developed across the resistor 17 by the current applied to the electrode 6 by the electron beam 2. It is not intended to limit this invention to this readout means, for example a capacitor and voltmeter could be substituted, respectively, for the resistor and oscilloscope to provide an integrated output of the current applied to electrode 6 as the beam is swept across the locator.

For clarity, the workpiece has been omitted from the illustration. However, it has been found to be convenient, in using this invention, to align the joint to be welded with the slit 10 so that, when the beam is focussed properly, the weld can be performed by simply moving the joint to the focal point location.

In accord with this invention, the focal point locator is used in the following manner to determine the location of the focal point of the electron beam. First, the locator is placed in the path of the beam approximately at the anticipated location of the undeflected beam. The locator 5 is placed on the work table 15 at a predetermined location with the slit aperture 10 aligned with a reference axis, for example, the X axis of the table. The electron beam is then turned on and swept across the locator in the Y axis direction as indicated by the dotted arc 19. The sweep frequently is conveniently 60 cycle although any frequency which permits the desired accuracy of determination to be achieved may be used. The oscilloscope 18 is connected to display the current pulses applied to the electrode 6 as the electron beam crosses the aperture. By moving the locator in the direction of the X axis, the point at which the beam strikes the electrode can be varied in the vertical or Z axis direction. When the portion of the beam which reaches the electrode is above or below the focal point, the current pulse received by the electrode will be relatively long lasting and low in magnitude since the beam is spread over some area as shown in FIGURE 4, curves $a$ and $c$. When the beam touches the electrode precisely at its focal point, the time period of the current pulse is a minimum and the magnitude is a maximum since the same number of electrons are delivered in a relatively shorter interval. This is shown in curve $b$ of FIGURE 4. Thus, by moving the locator back and forth in the X direction, the operator can locate the focal point by peaking the current pulse displayed on the oscilloscope. Since the slope of the inclined surface 7 is known, the height of the focal point above the work table 15 can be computed from the displacement of the electrode in the X direction or an arrangement can be provided for calibrating an indicator so that readout can be made directly in terms of the Z location of the focal point.

The width of aperture 10 may be any suitable value. For convenience, it is preferred that the width be approximately in the range of from 10% to 50% of the width of the electron beam 2 at its focal point. In this case, when the beam contacts the electrode above or below its focal point, the beam current is applied gradually to the electrode since a large part of the current is always shielded from the electrode. When the beam contacts the electrode at the focal point, the current is applied to the electrode in a substantially shorter time, thus making it easier for an operator observing the oscilloscope to distinguish the optimum location.

Since the locator aperture is not necessarily centered under the undeflected beam, it is also necessary to move the locator in the Y direction to determine whether or not there is another peak corresponding the one just located. If the locator was positioned directly under the underflected beam position, then the peak obtained is singular; however, if the locator was positioned at some other location along the Y axis, another peak will be found at the point where the focal point crosses the same Z axis height on the other side of the X axis. If this is the case and a second such peak is found, the undeflected location of the beam is the mid-point of the line along the Y axis between the two peaks. The locator is set at this position on the Y axis and moved in the X direction in the same manner as previously described to find the Z axis height of the focal point of the beam. When the current pulse of the oscillating beam is found at this location, the Y and Z locations of the focal point of the undeflected beam have been determined. To locate the X axis position of the undeflected beam, the locator may be turned through 90° to align the slit aperture with the Y axis and the beam may be swept along the X axis to determined the position of the undeflected beam. The same procedure as just described in connection with the Y axis is repeated.

The procedure described above has been stated in its most complex terms by virtue of the assumption that the position of the beam was completely unknown; in practice, the X-Y location of the beam may already be known with relatively high precision and the subject invention serves to provide the final degree of precision. However, in the case of the Z axis focal point determination, it has previously been extremely difficult to locate and control the beam; the locating apparatus of the present invention greatly simplifies this procedure. Alternatively, the X-Y location of the beam may be determined by placing an apertured member on the work table with the aperture in a known location and moving the focal point of the beam until it enters the aperture. The locating apparatus of this invention may then be spotted on this location and the vertical height of the focal point determined or adjusted.

It is also noted that the apparatus of this invention may be applied in other ways, for example to analyze the shape of the beam by determining the width and relative density at any point. Therefore, while I have shown and described a specific embodiment of my invention, it will be apparent to those skilled in the art that many changes and modifications may be made without departing from my invention in its broader aspects; and I therefore intend the appended claims to cover all such changes and modifications as fall within the true spirit and scope of my invention.

What I claim as new and desire to secure by Letters Patent of the United States is:

1. An electron beam welding apparatus comprising, in combination, an electron beam source; means for focusing said electron beam; and means for determining the focal point of said electron beam comprising an electrode having a surface inclined in a selected direction, means for moving said electrode in a horizontal plane and means for sweeping said beam transversely to the direction of said incline to determine the focal point of said beam by measuring the point of maximum current to said electrode.

2. Apparatus as claimed in claim 1 and further comprising means interposed between said beam source and said electrode defining a slit aperture along said surface parallel to the direction of said incline.

3. Apparatus as claimed in claim 2 wherein said slit defining means includes means for absorbing heat generated by said electron beam.

4. Apparatus as claimed in claim 1 wherein said moving means comprises means for moving said electrode in the direction of said incline.

5. Apparatus as claimed in claim 1 wherein the width of said aperture is approximately 10% to 50% of the width of said electron beam at its focal point.

6. In an electron beam welding apparatus including an electron beam source and means for focusing said beam, the combination therewith of means for locating the focal point of said beam comprising an electrode having a surface inclined in a selected direction, means for moving said electrode in a horizontal plane and means for sweeping said beam transversely to the direction of said incline to determine the focal point of said beam by measuring the point of maximum current to said electrode.

7. In an electron beam welding apparatus as claimed in claim 6, the further combination of means interposed between said beam source and said surface defining a slit aperture aligned with said incline for permitting passage of said beam to said electrode only when said beam is aligned with said aperture.

8. In an electron beam welding apparatus as claimed in claim 6 the combination wherein said moving means comprises means for moving said electrode in the direction of said incline.

References Cited

UNITED STATES PATENTS

| | | | |
|---|---|---|---|
| 2,844,706 | 7/1958 | Lorenz | 219—121 |
| 3,148,265 | 9/1964 | Hansen | 219—121 |
| 3,152,238 | 10/1964 | Anderson | 219—121 |
| 3,165,619 | 1/1965 | Cohen | 219—121 |
| 3,196,246 | 7/1965 | El-Kareh | 219—121 |
| 3,291,959 | 12/1966 | Schleich et al. | 219—121 |
| 3,340,377 | 9/1967 | Okazaki et al. | 219—121 |

RICHARD M. WOOD, *Primary Examiner.*

W. D. BROOKS, *Assistant Examiner.*